United States Patent Office 3,055,804
Patented Sept. 25, 1962

3,055,804
MANGE POWDERS
William Valentine, Nanuet, N.Y., and John James Vance, Park Ridge, N.J., assignors to American Cyanamid Company, New York, N.Y., a corporation of Maine
No Drawing. Filed Mar. 29, 1961, Ser. No. 99,052
5 Claims. (Cl. 167—53.2)

This invention relates to novel therapeutic compositions of matter and, more particularly, to mange powders prepared by absorbing soluble sulfur solutions on siliceous carriers whereby substantially dry, free-flowing powders are obtained.

Mange is a contagious skin disease caused by sarcoptic or demodectic mites. Natural infection with mange mites may take place either by direct contact with diseased animals or indirectly from various objects which have been in contact with diseased animals, e. g., harness, blankets, grooming utensils, bedding, stables or even attendants. The incubation period for the development of clinical mange depends on the mode and the place of infection and the susceptibility of the host. Usually 2 to 6 weeks elapse before the first visible skin lesions develop. Numerous species of animals are susceptible to mange, including horses, cattle, sheep, swine, goats, dogs and cats.

For treating isolated cases, acaricidal preparations have been applied by spraying, rubbing, or dipping. For groups of animals, dipping has been the most convenient and effective method of treatment. Although nicotine sulfate dip, lindane spray or dip, and cresote dip have been used in treating mange, soluble sulfur solutions remain the treatment of choice.

The soluble sulfur solutions employed in preparing the novel mange powders of the present invention are prepared by heating an anhydrous mixture of sulfur, calcium oxide, and polyhydric alcohol at a temperature within the range of from about 100° C. to 150° C. The preparative details and the properties of these soluble sulfur solutions are more fully set forth in U.S. Patent 2,390,746 to Stirn, which is hereby expressly incorporated by reference.

Heretofore, the undesirable properties of soluble sulfur solutions such as dark color, strong odor, relative instability, and unpleasant consistency have made them difficult to incorporate into acceptable veterinary formulations. Commercially, soluble sulfur has been sold as a 2% solution in anhydrous propylene glycol. When this solution is applied to the skin of an infected animal, sufficient moisture is absorbed by the vehicle to initiate the production of strong smelling, break-down products. Because of the inherent sensitivity to moisture of the propylene glycol soluble sulfur solution, consumer usage of this product for the treatment of mange has been limited.

Our invention is based upon the discovery that soluble sulfur solutions may be transformed into dry, free-flowing powders by absorbing the soluble sulfur solutions on a siliceous carrier. The resulting product has a much less offensive odor and may be readily applied to an infected animal by dusting. Furthermore, the resulting product does not tend to adhere to the walls of the containers in which it is prepared or stored.

In practicing this invention, the simplest procedure for obtaining dry, free-flowing mange powders is one of intimately intermixing the components with agitation. The order of addition is immaterial; the soluble sulfur solution may be added to the siliceous carrier or vice versa. No substantial problem is encountered in obtaining the desired products even when large quantities of the components are utilized.

The proportion of soluble sulfur solution to siliceous carrier may be as high as 70% by weight of soluble sulfur solution to 30% by weight of siliceous carrier. Of course, smaller proportions of soluble sulfur solution to siliceous carrier are preferably used. This is merely the practical upper limit of the soluble sulfur solution since the saturation point of the soluble sulfur solution on the siliceous carrier must be avoided. A preferred embodiment of the present invention is a dry, free-flowing mange powder comprising from about 60% to about 5% by weight of soluble sulfur solution absorbed on from about 25% to about 95% by weight of a siliceous carrier. Where the soluble sulfur solution and siliceous carrier together constitute less than 100% by weight of the mange powder, the remainder is made up of other ingredients such as, for example, fillers, preservatives, flavoring oils, solvents, and the like.

The siliceous carriers of this invention include any of a number of commercially available siliceous carriers produced either in the vapor phase or the liquid phase. The most important characteristic of these siliceous carriers is their extremely large surface area; this may run between 100 to 400 square meters per gram. The siliceous carriers are dry, highly porous powders having an ultimate particle size of from about 0.01 micron to about 50 microns. They contain somewhere between 85% and 98% of siliceous material, the remainder being made up of various organic and inorganic constituents. The siliceous material may be present as silicon dioxide, silicic acid, or silicic acid salts such as calcium silicate. The siliceous material is the only important constituent of the siliceous carrier; as long as the other constitutents are non-toxic, their identity is immaterial. In the practice of the present invention, it is preferred to employ siliceous carriers having an average ultimate particle size of from about 0.01 micron to about 1.0 micron.

It is an advantage of the present invention that any of the commonly known flavoring oils and extracts such as oil of cassia, oil of peppermint, oil of wintergreen, ginger extract, anise extract, vanilla extract, clover red oil, and imitation coumarin oil may be simultaneously absorbed on the siliceous carrier so as to give a lasting scent to the free-flowing powder of the soluble sulfur solution. Various preservatives such as p-chlorom-xylenol, and various fillers such as talc, kieselguhr, and magnesium oxide, may also be added in the preparation of the mange powders of the present invention.

The following examples will serve to illustrate our invention:

*Example 1*

To ten parts of propylene glycol was added two parts of calcium oxide and one part of powdered sulfur. The reaction mixture was slowly heated in a reaction vessel to a temperature of 140° C. and held at this temperature for 30 minutes. The reaction mixture was then cooled to 25° C. and filtered whereby there was obtained a clear, yellow, oily filtrate.

Six parts of the above solution was blended with four parts of silicic acid whose average ultimate particle size was from 0.01 micron to 1.0 micron. The blending was continued until uniform absorption had taken place, followed by milling through a comminuting apparatus equipped with a number 80 mesh screen. The final product was a free-flowing, non-sticky mange powder which was applied topically as a dust to dogs suffering from mange. It was found to be extremely effective and left no objectionable residue on the surface treated. The mange powder of this example was found to be stable at room temperature and usable even after being exposed for one month at room temperature. On the other hand, upon exposure at room temperature, the soluble sulfur solution suffered apparent decomposition and was extremely odoriferous after only one week.

*Example 2*

200 Parts of the mange powder prepared as in Example 1 was blended with one part of clover red oil, and blending was continued until uniform absorption had taken place. The odor of the soluble sulfur solution in the resulting product was well masked by the clover red oil. This pleasant-smelling mange powder was used as a topical dust on dogs suffering from mange with excellent results.

*Example 3*

Two parts of powdered calcium oxide and one part of precipitated sulfur were mixed with ten parts of propylene lycol. The suspension was heated over a boiling water bath until the temperature of the reaction mixture had risen to 115° C. Heating was continued for 2½ to 3 hours with occasional stirring after which the reaction mixture was filtered while hot. Thus there was obtained a clear, yellow, oily filtrate.

In 3.8 parts of propylene glycol was dissolved 0.1 part of p-chloro-m-xylenol, 0.1 part of hexachlorophene, 1.0 part of imitation coumarin oil, and 10 parts of olcyl alcohol. The resulting solution was dissolved in 20 parts of the above-prepared soluble sulfur solution. This resulting solution was blended with 25 parts of silicic acid whose average ultimate particle size was from 0.01 micron to 1.0 micron. The blending was continued until uniform absorption had taken place. To this dry blend was added 40 parts of talc and the mixture was further blended by milling through a comminuting apparatus equipped with a number 80 mesh screen. The final product was a pleasant-smelling, free-flowing, non-sticky mange powder which was applied topically to dogs suffering from mange with excellent results.

We claim:
1. A stable, substantially dry, free-flowing mange powder comprising a soluble sulfur solution and a siliceous carrier, said mange powder containing not substantially more than about 70% by weight of said soluble sulfur solution, and said siliceous carrier having a surface area of from about 100 to about 400 square meters/gram.

2. A stable, substantially dry, free-flowing mange powder as in claim 1 wherein the average ultimate particule size of said siliceous carrier is between about 0.01 micron and about 1.0 micron.

3. A stable, substantially dry, free-flowing mange powder comprising from about 60% to about 5% by weight of a soluble sulfur solution and from about 25% to about 95% by weight of a siliceous carrier having a surface area of from about 100 to about 400 square meters/gram.

4. A stable, substantially dry, free-flowing mange powder as in claim 3 wherein the average ultimate particle size of said siliceous carrier is between about 0.01 micron and about 1.0 micron.

5. A process for the production of a stable, substantially dry, free-flowing mange powder containing a therapeutic amount of a soluble sulfur solution which comprises adding an amount, not substantially more than 70 parts by weight, of a soluble sulfur solution to not substantially less than 30 parts by weight of a siliceous carrier having an average ultimate particle size of from about 0.01 micron to about 1.0 micron and a surface area of from about 100 to about 400 square meters/gram, and thoroughly blending the mixture so obtained.

References Cited in the file of this patent

UNITED STATES PATENTS

| | | |
|---|---|---|
| 2,390,746 | Stirn | Dec. 11, 1945 |
| 2,830,010 | Valentine | Apr. 8, 1958 |
| 2,879,161 | Valentine | Mar. 24, 1959 |